United States Patent [19]
Komori

[11] Patent Number: 5,363,231
[45] Date of Patent: Nov. 8, 1994

[54] LIGHT DEFLECTING DEVICE

[75] Inventor: Shin Komori, Yokohama, Japan

[73] Assignee: Canon Kabushiki Kaisha, Tokyo, Japan

[21] Appl. No.: 1,408

[22] Filed: Jan. 7, 1993

Related U.S. Application Data

[63] Continuation of Ser. No. 750,723, Aug. 21, 1991, abandoned, which is a continuation of Ser. No. 476,248, Feb. 7, 1990, abandoned.

[30] Foreign Application Priority Data

Feb. 9, 1989 [JP] Japan ................................ 1-30234

[51] Int. Cl.$^5$ ............................................. G02B 26/08
[52] U.S. Cl. ................................. 359/219; 359/198; 359/212; 359/872; 359/900; 346/108
[58] Field of Search .................... 350/6.5–6.8, 350/3.71, 616, 631, 632; 250/234–236; 359/212, 213, 216, 217, 223, 224, 855, 871, 872, 196–198, 214, 219, 220, 900; 346/108, 160

[56] References Cited

U.S. PATENT DOCUMENTS

| | | | |
|---|---|---|---|
| 4,623,216 | 11/1986 | Sato et al. | 359/217 |
| 4,717,223 | 1/1988 | Ishida et al. | 359/217 |
| 4,915,465 | 4/1990 | Sugiura | 359/212 |
| 5,103,335 | 4/1992 | Sugiura | 359/217 |

FOREIGN PATENT DOCUMENTS

| | | |
|---|---|---|
| 0278332 | 8/1988 | European Pat. Off. |
| 59-197009 | 8/1984 | Japan |
| 63-188112 | 8/1988 | Japan |

Primary Examiner—Loha Ben
Assistant Examiner—James Phan
Attorney, Agent, or Firm—Fitzpatrick, Cella, Harper & Scinto

[57] ABSTRACT

A light deflecting device for deflecting a light beam comprises a rotational mirror having two reflecting surfaces for reflecting the light beam, a rotational mirror mounting portion, biasing means for urging the rotational mirror against the mounting portion, and driving means for rotating the mounting portion.

20 Claims, 3 Drawing Sheets

FIG. 8

LIGHT DEFLECTING DEVICE

This application is a continuation of application Ser. No. 07/750,723 filed Aug. 21, 1991, now abandoned, which was a continuation application Ser. No. 07/476,248, filed Feb. 7, 1990 now abandoned.

BACKGROUND AND SUMMARY OF THE INVENTION

This invention relates to a light deflecting device for use in a laser beam printer, a bar code reading apparatus or the like and a device for regulating such device.

Heretofore, in light deflecting devices for deflecting a light beam, rotational polygon mirrors rotatable in one direction have been widely used because of the stability of their speed of rotation and their scanning speed.

However, where such a rotational polygon mirror is used as the light deflecting device of a scanning optical apparatus, there is a problem that the deflecting-scanning surface or the reflecting surface thereof tilts from a plane perpendicular to the ideal main scanning surface to be formed by a scanning beam deflected thereby.

A means for solving such a problem is, for example, one as disclosed in Japanese Laid-Open Patent Application No. 63-188112 (corresponding U.S. Application Ser. No. 149,020 filed on Jan. 27, 1988 (now U.S. Pat. No. 4,915,465) and corresponding EP Application No. 88101263 filed on Jan. 28, 1988 and published on Aug. 17, 1988 under EP Publication No. 0278332). That is, the opposed portions of a cylindrical metallic member are cut into parallel flat surfaces and these two surfaces are used as reflecting surfaces for deflecting and scanning a light beam. This rotational mirror is mounted so that the two parallel reflecting surfaces may be parallel to the direction of inclination of the mounting flange surface of the rotational mirror and thereby the above-mentioned tilt of the reflecting surface of the rotational mirror by the inclination of the mounting flange surface may not occur, whereby the irregularity of the pitch of scanning lines on a surface scanned by a scanning beam may be minimized.

By this method, it is made unnecessary to use an expensive special optical system for correcting the above-mentioned tilt (a so-called tilt correcting optical system) which has heretofore been required.

However, the inclination of the mounting flange surface of the rotational mirror is generally very small and it is difficult to detect the direction of this inclination. Accordingly, it is also difficult to assemble the rotational mirror with the reflecting surface of the rotational mirror and the direction of inclination of the mounting flange surface being made parallel to each other. Also, even if the direction of inclination is detected at all, there is irregularity during assembly and therefore, it is nearly impossible to assemble a great quantity of rotational mirrors always with good accuracy.

So, in order to reliably achieve a construction in which the reflecting surface of the rotational mirror and the direction of inclination of said mounting flange surface are made parallel to each other, it is an object of the present invention to provide a light deflecting device having structure which can be regulated so that the direction of inclination of the mounting flange surface and the reflecting surface of the rotational mirror may reliably become parallel to each other after the rotational mirror is incorporated into the light deflecting device, and a regulating device therefor.

To achieve the above object, the light deflecting device according to the present invention is of such a construction that by biasing means, the rotational mirror is urged against the mounting surface of a rotational mirror mounting portion rotatable by a rotational mirror driving motor and the rotational mirror can be separated from the mounting surface against the biasing force of the biasing means and when so separated, the rotational mirror and the mounting surface can rotate relative to each other.

Accordingly, after the rotational mirror has been incorporated into the device, the phase relation between the rotational mirror and said mounting surface can be regulated and the rotational mirror can be reliably brought into a state in which the reflecting surface thereof becomes parallel to the direction of inclination of said mounting surface.

In a regulating device in such a light deflecting device, the rotary shaft of the driving motor can be fixed by a clamp portion to thereby fix the mounting surface of the rotational mirror mounting portion and the rotational mirror can be rotated while being floated up from said mounting surface by the pawl of the regulating device, thereby change the phase position thereof.

DESCRIPTION OF THE PREFERRED EMBODIMENTS

Figure 1:
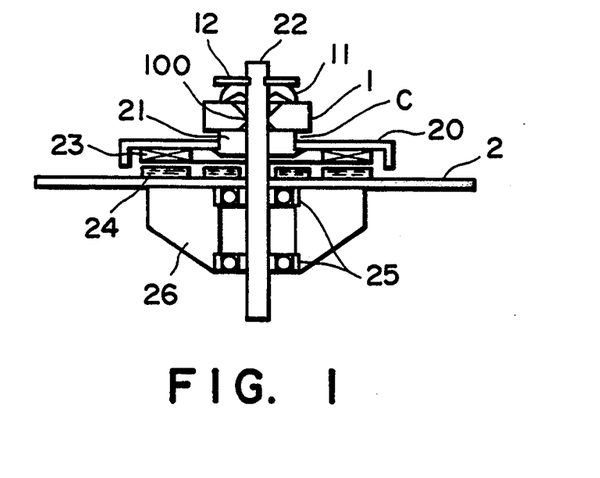
FIG. 1 is a cross-sectional view of an embodiment of the light deflecting device of the present invention.
Figure 2:
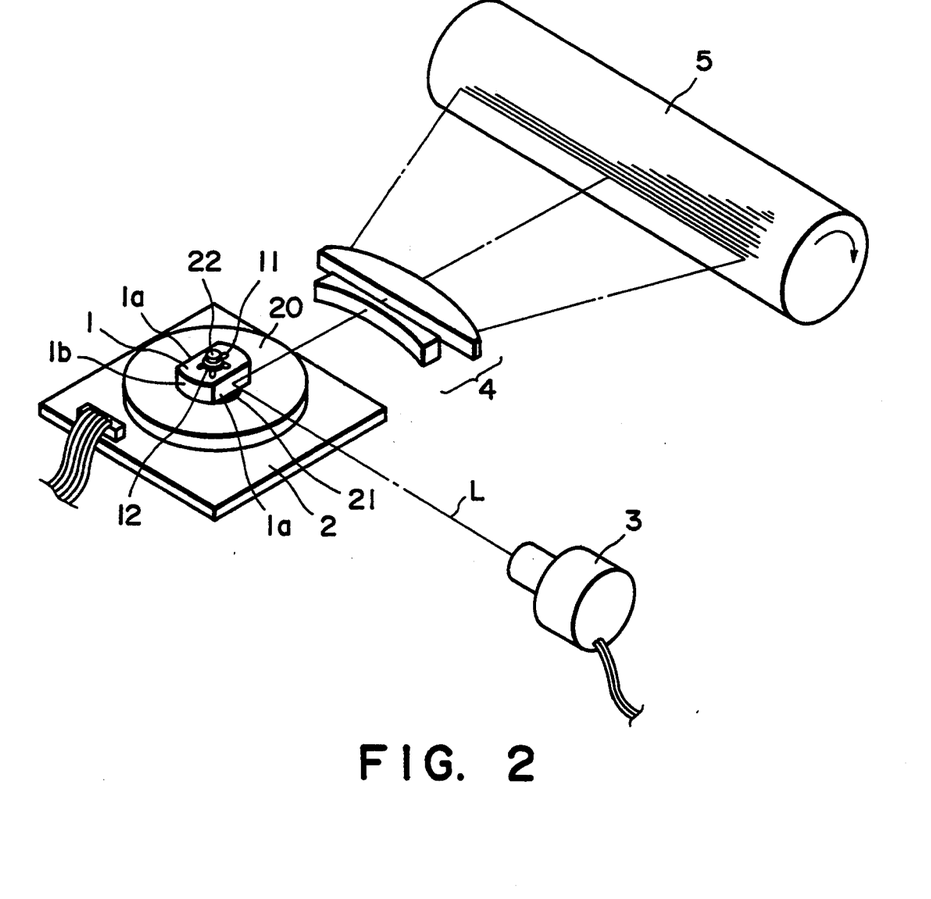
FIG. 2 schematically shows the construction of a scanning optical apparatus using the light deflecting device of the present invention.

FIG. 1 is a cross-sectional view of an embodiment of the light deflecting device of the present invention. FIG. 2 schematically shows the construction of a scanning optical apparatus using the light deflecting device shown in FIG. 1. In the figures, the reference numeral 1 designates a rotational mirror having its two opposed surfaces cut into flat surfaces and worked into mirror surfaces to provide reflecting surfaces 1a for deflecting and scanning a laser beam, and the reference numeral 2 denotes a driving motor for rotatively driving the rotational mirror 1. A laser beam L emitted from a laser source unit 3 including a semiconductor laser and a collimator lens is incident on the rotational mirror 1 and is deflected and scanned thereby.

The reflecting surfaces 1a of the rotational mirror 1 for deflecting and scanning the laser beam are substantially flat surfaces and the portions 1b of the rotational mirror which do not deflect and scan the laser beam are curved surfaces. These curved surfaces are arcuate surfaces which are centered about the center of rotation of the rotational mirror 1.

The rotational mirror 1 is mounted on a mounting portion 21 (a mounting flange) which lies in the central portion of the rotor 20 of the driving motor 2. The mounting portion 21 is constructed integrally with the rotary shaft 22 of the driving motor 2.

The laser beam L deflected and scanned by the rotational mirror 1 passes through an imaging lens system 4 endowed with the f·θ function (the function in which the ideal image height is given by the product of the focal length f and the beam incidence angle θ), whereafter it is imaged on a photosensitive drum 5, which is a surface to be scanned, and forms a latent image.

Further, around the photosensitive drum 5, there are disposed process instruments, not shown, such as a primary charger, a developing device for causing a developer to adhere to that portion of the photosensitive drum 5 which has been subjected to exposure and effecting positive development, a transfer charger and a cleaner, and printing is effected on paper or the like by the known electrophotographic process.

Even when there is an angle of inclination between the mounting surface of the flange 21 and the rotary shaft of the motor 2 (in other words, the mounting surface of the flange 21 is inclined from state parallel to the ideal main scanning plane to be formed by the scanning beam), the reflecting surfaces 1a of the rotational mirror 1 are made parallel to the direction of inclination of the mounting surface of the flange 21 and the rotational mirror 1 is mounted so that the reflecting surfaces 1a may not be inclined from a state perpendicular to said ideal main scanning plane, whereby the unevenness of the pitch of the scanning lines in the sub scanning direction which is a direction perpendicular to the main scanning plane that ought to occur due to the inclination of the mounting surface of the flange 21 can be prevented.

A construction which makes this possible will now be described in detail. In the cross-sectional view of the vicinity of the motor 2 shown in FIG. 1, the outer periphery of the flange 21 on which the rotational mirror 1 is mounted is smaller in diameter than the circumscribed circle of the rotational mirror 1, and the flange 21 is fixed to the rotary shaft 22 as by shrinkage fit or adhesion and is fixed to the rotor 20 by caulking. The upper surface of the rotor 20 and the bottom surface of the rotational mirror 1 are not in contact with each other. A driving magnet 23 is mounted inside the rotor 20, and by electrically energizing a driving coil 24 disposed in opposed relationship with the magnet 23 and mounted on the body portion of the motor 2, the rotor 20 is rotatively driven in accordance with a force produced between the magnet 23 and the coil 24. This rotative driving is highly accurately controlled by a Hall element or the like, not shown. Further, the driving motor 2 is comprised of a bearing 25 and a motor case 26 having this bearing, etc. therein.

The hollow portion of the rotational mirror 1 having its opposed two surfaces formed into the reflecting mirror surfaces 1a which is fitted to the rotary shaft 22 is greatly chamfered in the edge portions thereof so that the fitted portion 100 thereof to the rotary shaft 22 may become as small as possible and the rotary shaft 22 and the fitted portion 100 may almost be in line contact with each other. That is, design is made such that the thickness of the fitted portion in a direction parallel to the rotary shaft is remarkably small as compared with the thickness of the rotational mirror.

The rotational mirror 1 is controlled from above and urged against the flange 21 by a resilient member 11 (biasing means) such as a star-shaped spring. Thus, a frictional force works between the bottom surface of the rotational mirror 1 and the mounting surface of the flange 21, whereby the rotational mirror 1 is fixed to the flange 21, and the rotor 20, the flange 21, the rotary shaft 22, the rotational mirror 1, etc. rotate as a unit. In the upper portion of the resilient member 11, a fixing member 12 for the purpose of tightening or the like is fixed to the rotary shaft 22 and holds down the resilient member 11 between itself and the upper surface of the rotational mirror 1

Figure 3:
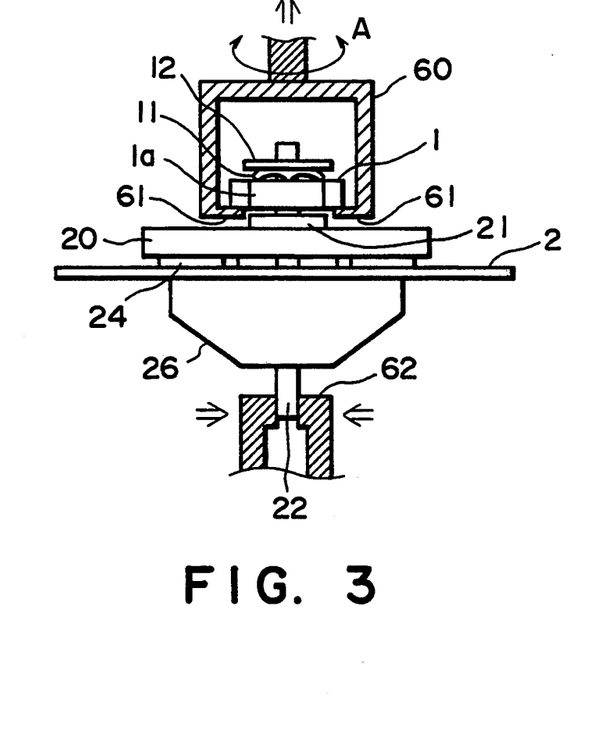
FIG. 3 illustrates a method of regulating the phase relation of a rotational mirror.

A method of regulating the rotational mirror 1 so that the reflecting surfaces 1a thereof may be parallel to the direction of inclination of the surface of the flange 21 after assembly will now be described with reference to FIGS. 3 and 4. FIG. 3 illustrates a method of regulating the phase position of the rotational mirror, and FIG. 4 is a graph showing the relation between the phase position of the rotational mirror and the amount of unevenness of pitch.

Figure 4:
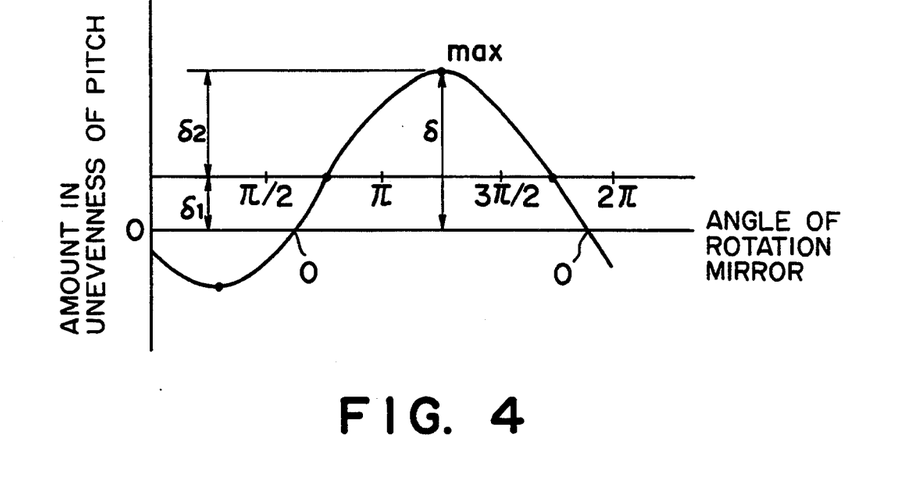
FIG. 4 is a graph showing the relation between the phase position of the rotational mirror and the amount of unevenness of pitch.

FIG. 4 shows the amount of unevenness of the pitch of the scanning lines when the phase of the rotational mirror 1 arbitrarily mounted on the surface of the flange 21 (the position of the rotational mirror 1 relative to the flange 21 as it is represented in terms of the angle of rotation about the rotary shaft 22 with the arbitrary mounted position as the reference) is changed in succession.

In this figure, the graph approximate to a sine curve indicated by an amplitude $\delta_2$ shows the relation between the amount of unevenness of the pitch and the angle of the rotational mirror when only the inclination of the surface of the flange 21 is taken into consideration. If the tilt of the mirror surface of the rotational mirror itself is further added thereto, the O position becomes offset by $\delta_1$ as shown. In this figure, the length from the O position to the curve is the amount of unevenness of the pitch, and the maximum amount of unevenness of the pitch is $\delta$.

Usually, the inclination of the surface of the flange is greater than the tilt of the mirror surface of the rotational mirror and therefore, the relation as shown in FIG. 4 is established and it is possible to nullify the amount of unevenness of the pitch. However, when the machining accuracy and mounting accuracy of the surface of the flange are good and the inclination of the surface of the flange becomes smaller than the tilt of the mirror surface of the rotational mirror, $\delta_2$ in the figure becomes very small and the amount of unevenness of the pitch will not become zero even if the angle of the rotational mirror is changed.

Here, if the focal length of the imaging optical system is up to the order of 100 mm, the tilt of the mirror surface of the rotational mirror will pose no problem if the existing machining accuracy is used and therefore, the inclination of the surface of the flange can be considered to be the main factor of the unevenness of the pitch.

However, where the focal length of the imaging optical system is greater than that indicated above, it is preferable to make the inclination of the surface of the flange greater than the tilt of the mirror surface so that the relation as shown in FIG. 4 may be brought about.

An example in which the phase regulation of the rotational mirror 1 is automatically effected as by an automatic regulating machine will hereinafter be described with reference to FIGS. 1 and 3.

Since, as previously described, the size of the mounting surface of the flange 21 is smaller than the outer peripheral circle circumscribed by the curved surface which is the nonreflecting surface 1b of the rotational mirror 1, gaps C are formed at two substantially opposed locations between the upper surface of the rotor 20 and the bottom surface of the rotational mirror 1. In order that such gaps may be formed, the outer periphery of the flange 21 may lie inside the outer periphery of the rotational mirror 1 at least two locations (of course, at one location if it is continuous), and the example shown above is merely exemplary. The pawls 61 of an automatic regulating machine 60 (shown by hatching to distinguish it from the rotational mirror 1, etc.) are inserted into such gaps C, and the pawls 61 are urged against the bottom surface of the rotational mirror 1 to thereby slightly raise the rotational mirror 1 against the biasing force of the resilient member 11 and separate it from the mounting surface of the flange 21.

If at this time, the force of the resilient member 11 becomes too strong, the rotational mirror 1 will be distorted and therefore, such structure that the amount of float-up of the rotational mirror 1 is made as small as possible and moreover the regulating force of the resilient member 11 is not much varied by a variation in the amount of float-up is desirable.

According to the experiment, distortion occurred to the reflecting surfaces 1a when a load of 5 kg was applied to the rotational mirror 1 and therefore, it is necessary that the regulating force or the biasing force of the resilient member 11 be less than 5 kg. Accordingly, assuming that the amount by which the rotational mirror 1 is floated up to change the phase of the reflecting surfaces 1a thereof is of the order of 0.1 to 0.2 mm, it is necessary to make the deformation stroke required of the resilient member 11 small so that even when the rotational mirror 1 is floated up, the force applied from the resilient member 11 to the rotational mirror 1 may not exceed 5 kg.

In this manner, there is provided a construction in which the rotational mirror can be separated from the mounting surface against the biasing means and the rotational mirror and the mounting surface of the rotational mirror mounting portion integral with the rotary shaft can rotate relative to each other. The pawls are for rotating the rotational mirror relative to the rotary shaft while separating the rotational mirror from the rotational mirror mounting portion or the flange against the biasing means or the resilient member.

Also, in the present embodiment, that portion 100 of the rotational mirror 1 which contacts with the shaft or the rotary shaft 22 is made small so that the frictional action between the rotational mirror and the shaft 22 may not become great when the rotational mirror 1 is floated up or when the rotational mirror 1 is rotated about the shaft 22 to thereby change the phase thereof. As means for reducing such friction, that portion of the shaft 22 which is fitted to the rotational mirror may be partly worked into a concave portion 220, as shown in FIG. 5, whereby the same effect may be obtained.

Figure 5:
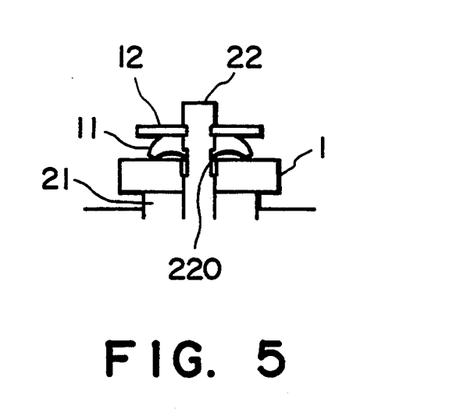
FIG. 5 is a cross-sectional view of another embodiment of the light deflecting device of the present invention.

FIG. 5 is a cross-sectional view showing another embodiment of the light deflecting device of the present invention.

In FIG. 5, that portion of the rotational mirror which is fitted to the rotary shaft is formed more thinly than the thickness of the rotational mirror. If the thickness of this portion which is fitted to the rotary shaft in a direction parallel to the rotary shaft is small, as in the case of the rotational mirror shown in FIG. 1, the frictional action between the rotational mirror and the rotary shaft will not become great when the rotational mirror is floated up or when the rotational mirror is rotated about the rotary shaft to thereby change the phase thereof. Consequently, it is preferable that the thickness of the portion which is fitted to the rotary shaft in the direction parallel to the rotary shaft be ½ or less of the thickness of the rotational mirror.

That is, the hole extending through the body of the rotational mirror having reflecting surfaces on the sides thereof has a first diameter and a second diameter smaller than the first diameter, and the thickness of the portion having the second diameter in a direction substantially parallel to said reflecting surfaces is ½ or less of the thickness of the body of the rotational mirror.

Simultaneously with the rotational mirror 1 being floated up by the automatic regulating machine 60 as described above, one end portion of the shaft 22 vertically protruding from the case 26 of the motor 2 is fixed by the clamp portion 62 of the automatic regulating machine 60. Thereby the shaft 22 is fixed and the position of the flange 21 is fixed. If in this case, there is a limitation in the shape of the motor 2 and the shaft 22 cannot be protruded downwardly, the side portion of the rotor 20 may be held or the upper portion of the shaft 22 which protrudes upwardly from the fixing member 12 may be held to thereby fix the position of the flange 21.

When the rotational mirror is separated from the mounting surface of the flange and the position of the mounting surface of the flange is fixed, the rotational mirror held by the pawls is rotated relative to the mounting surface by a predetermined amount in the direction of arrow A to thereby change the phase thereof by a predetermined amount. After the phase has been changed by a predetermined amount, the pawls are lowered and the rotational mirror is again mounted on the mounting surface of the flange, whereafter the fixing of the position of the mounting surface is released. Then, the light beam from the light source is deflected and scanned by the rotational mirror being rotated and the amount of unevenness of the pitch is detected.

The above-described operation is repeated and the rotational mirror 1 is rotated in the direction of arrow A to thereby change the phase thereof variously, and the beam is actually deflected and scanned in each phase position to find out a phase position in which the unevenness of the pitch becomes small, whereupon the regulation is completed.

Figure 6:
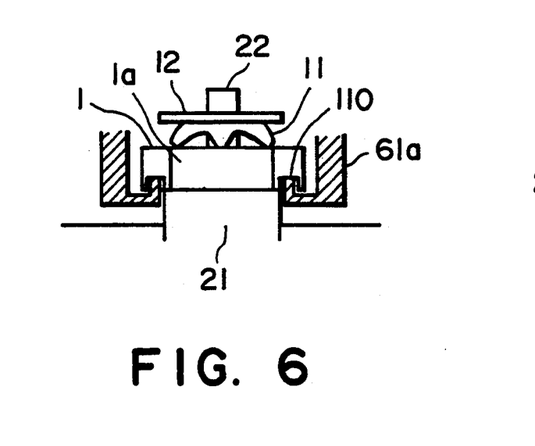
FIGS. 6 and 8 illustrate further methods of regulating the phase relation of the rotational mirror.

FIG. 6 illustrates another method of regulating the phase relation of the rotational mirror, and is a view of the rotational mirror as it is seen from sideways thereof.

FIG. 6 shows an embodiment in which a pair of grooves or holes 110 are formed in the bottom surface of the rotational mirror 1, and the pawls 61a of the automatic regulating machine are caught in these holes 110 and thus, it is easy to float up the rotational mirror 1 and change the phase thereof.

Figure 7:
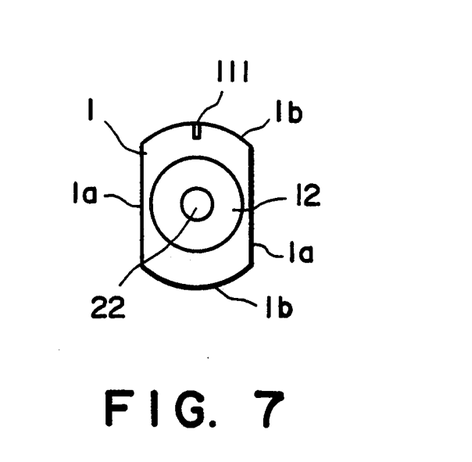
FIG. 7 is a view of the rotational mirror of the present invention as it is seen from above.

FIG. 7 is a view of the rotational mirror of the present invention as it is seen from above.

FIG. 7 shows an embodiment in which a portion of the upper surface of the rotational mirror 1 is made into a mirror surface 111 formed with a mark. As previously described, there is a relation as shown by the sine curve of FIG. 4 between the phase and the amount of unevenness of the pitch and therefore, if the phase relation between the flange 21 and the rotational mirror 1 can be directly detected, it will become unnecessary to see the unevenness of the pitch in each phase position each time and the regulation will be completed by only the detection of that phase and thus, the regulation can be accomplished more quickly. So, if a position detecting sensor, not shown, is installed above the rotational mirror 1 and the reflected light from the mark 111 of the rotational mirror 1 is detected, the phase of the rotational mirror 1 can be detected. In this manner, the regulation can be accomplished efficiently in this embodiment.

The mark 111 shown in FIG. 7 is a mark which indicates the position of the reflecting surface of the rotational mirror associated with the position of the reflecting mirror, and it is provided on a portion of the upper surface which is the other portion than the reflecting surfaces 1a of the rotational mirror. Of course, the mark may be provided on the side portion of the rotational mirror which is not provided with the reflecting surfaces.

Also, the mark shown in FIG. 7 is an optically detectable mark, but alternatively, it may of course be a mechanically, electrically or magnetically detectable mark.

Figure 8:
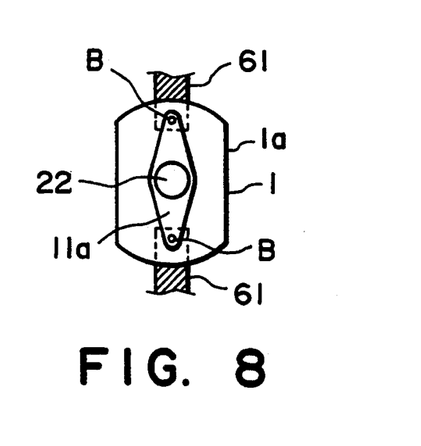

FIG. 8 illustrates another method of regulating the phase relation of the rotational mirror, and is a view of the rotational mirror as it is seen from above.

In the example shown in FIG. 8, a position B at which the force of a resilient member 11a regulating the rotational mirror 1 from above acts is on the upper portion of the rotational mirror 1 which corresponds to the portion in which the pawls 61 of the automatic regulating machine are engaged with the rotational mirror 1. Thus, it is difficult for the distortion by a shearing force to occur to the rotational mirror 1. The resilient member 11a in this example, as shown, is of an elongate lozenge shape as viewed from above and of a simple angled shape as viewed from sideways and therefore, the effective stroke of the spring can be made longer than that of the aforedescribed star-shaped spring and the reduction in the function of the spring is small and thus, this resilient member 11a can be said to have a preferable shape. The resilient member 11a causes its force to act on the positions on the rotational mirror which correspond to the gaps between the upper surface of the rotor on which the pawls of the automatic regulating machine lie and the bottom surface of the rotational mirror.

While in the above-described embodiments of the present invention, there has been shown a construction in which the rotary shaft, rotor and flange of the driving motor are integrally formed by discrete members, they may of course be integrally formed by one and the same member.

By the above-described construction, in the present invention, the unevenness of the pitch of the scanning lines can be minimized to that due to the other factors than the tilt of the deflecting-reflecting surface (for example, that due to the vibration of the device), and this can contribute to the high quality of recorded image which has been desired in recent years.

Further, the phase position of the rotational mirror can be regulated after assembly and therefore, in every light deflecting device assembled, the irregularity during assembly is eliminated and the direction of inclination of the surface of the flange and the reflecting surfaces of the rotational mirror can be made parallel to each other, and the unevenness of the pitch of the scanning lines can be minimized.

It is claimed:

1. A light deflecting apparatus for deflecting a light beam, comprising
    a rotational mirror having at least a reflecting surface for reflecting the light beam;
    a rotational mirror mounting portion;
    biasing means for urging said rotational mirror against said mounting portion so that said rotational mirror and said mounting portion rotate together;
    driving means for rotating said mounting portion; and
    means for separating said rotational mirror from said mounting portion against said biasing means and for effecting rotation of said rotational mirror relative to said mounting portion.

2. An apparatus according to claim 1, wherein said rotational mirror includes two reflecting surfaces.

3. A light deflecting apparatus according to claim 1, wherein said separating means is provided on a non-reflecting surface side of said rotational mirror.

4. A light deflecting apparatus according to claim 1, wherein said rotational mirror includes a portion engageable with said separating means on a bottom of the non-reflecting surface.

5. A method of regulating a light deflecting device for deflecting a light beam, comprising the steps of:
    urging a rotational mirror against the mounting surface of a mirror mounting portion by biasing means so that said rotational mirror and said mirror mounting portion rotate together, said rotational mirror having only two reflecting surfaces opposed to each other;
    separating the rotational mirror from said mounting surface against said biasing means; and
    rotating the rotational mirror relative to said mounting surface.

6. A light deflecting apparatus for deflecting a light beam, comprising:
    a deflector having a reflecting surface for deflecting the light beam;
    a deflector mounting portion;
    biasing means for urging said deflector against said mounting portion so that said deflector and said mounting portion rotate together;
    driving means for rotating the mounting portion; and
    means for separating said deflector from said mounting portion against said biasing means and for effecting rotation of said deflector relative to said mounting portion.

7. An apparatus according to claim 6, wherein said deflector includes two reflecting surfaces.

8. A light deflecting apparatus according to claim 6, wherein said separating means is provided on a non-reflecting surface side of said deflector.

9. A light deflecting apparatus according to claim 6, wherein said deflector includes a portion engagable with said separating means on a bottom of the non-reflecting surface.

10. A method for regulating a light deflecting apparatus for deflecting a light beam, comprising the steps of:
    urging a deflector against a mounting surface of a mounting portion by biasing means so that said deflector having and said mounting portions rotate together, said deflector having only two reflecting surfaces opposed to each other;

separating the deflector from said mounting surface against said biasing means; and rotating the deflector relative to said mounting surface.

11. A light deflecting apparatus for deflecting a light beam, comprising:

a deflector having only two reflecting surfaces opposed to each other for deflecting the light beam, and two non-reflecting portions interposed between the reflecting surfaces;

a deflector mounting portion having a raised deflector mounting surface which is smaller than a bottom surface of the non-reflecting portions of said deflector;

biasing means for urging said deflector against said deflector mounting surface such that a gap is provided between the bottom surface of the non-reflecting portions of said deflector and said mounting portion; and driving means for rotating said deflector mounting portion.

12. A laser beam printing apparatus comprising:

laser generating means for generating a laser light;

a deflector having only two reflecting surfaces opposed to each other for deflecting the laser light, and two non-reflecting portions interposed between the reflecting surfaces;

a deflector mounting portion having a deflector mounting surface which is smaller than a bottom surface of the non-reflecting portions of said deflector;

biasing means for urging said deflector against said deflector mounting surface such that a gap is provided between the bottom surface of the non-reflecting portions of said deflector and said mounting portion;

driving means for rotating said deflector mounting portion; and a photosensitive member for receiving the laser light deflectively scanned by said deflector.

13. A light deflecting apparatus for deflecting a light beam, comprising:

a deflector having only two reflecting surfaces opposed to each other for deflecting the light beam;

a deflector mounting portion;

biasing means for urging said deflector against said deflector mounting portion so that said deflector and said deflector mounting portion rotate together; and driving means for rotating said deflector mounting portion, wherein said deflector is provided with a portion adapted to engage with means which separates said deflector from said deflector mounting portion against said biasing means and which effects rotation of said deflector relative to said mounting portion.

14. A light deflecting apparatus according to claim 13, wherein the bottom surface of said deflector is provided with the portion adapted to engage with means for separating said deflector from said deflector mounting portion.

15. A laser beam printing apparatus comprising:

a laser light generating means for generating a laser light;

a deflector having only two reflecting surfaces opposed to each other for deflecting the laser light;

a deflector mounting portion;

biasing means for urging said deflector against said deflector mounting portion so that said deflector and said deflector mounting portion rotate together;

driving means for rotating said deflector mounting portion; and a photosensitive member for receiving the laser light deflectively scanned by said deflector, wherein said deflector is provided with a portion adapted to engage with means which separates said deflector from said deflector mounting portion against said biasing means and which effects rotation of said deflector relative to said mounting portion.

16. A laser beam printing apparatus according to claim 15, wherein the bottom surface of said deflector is provided with the portion adapted to engage with means for separating said deflector from said deflector mounting portion.

17. A light deflecting apparatus for deflecting a light beam, comprising:

a deflector having only two reflecting surfaces opposed to each other for deflecting the light beam, and two non-reflecting portions interposed between the reflecting surfaces;

driving means having a deflector mounting surface on an upper surface thereof, said deflector mounting surface projecting from an upper surface of said driving means, said driving means for rotating said deflector mounting surface; and biasing means for urging said deflector against said deflector mounting surface, wherein said deflector mounting surface is smaller than a bottom surface of the non-reflecting portions of said deflector and a gap is provided between the bottom surface of the non-reflecting portions of said deflector and the upper surface of said driving means.

18. A laser beam printer apparatus comprising:

laser generating means for generating a laser light;

a deflector having only two reflecting surfaces opposed to each other for deflecting the laser light, and two non-reflecting portions interposed between the reflecting surfaces;

driving means having a deflector mounting surface on an upper surface thereof, said deflector mounting surface projecting from an upper surface of said driving means, said driving means for rotating said deflector mounting surface;

biasing means for urging said deflector against said deflector mounting surface; and a photosensitive member for receiving the laser light deflectively scanned by said deflector, wherein said deflector mounting surface is smaller than a bottom surface of the non-reflecting portions of said deflector and a gap is provided between the bottom surface of the non-reflecting portions of said deflector and the upper surface of said driving means.

19. A light deflecting apparatus for deflecting a light beam, comprising:

a deflector having only two reflecting surfaces opposed to each other for deflecting the light beam, and two non-reflecting portions interposed between the reflecting surfaces;

a deflector mounting portion having a deflector mounting surface;

driving means for holding said deflector mounting portion on an upper surface of said driving means and for rotating said deflector mounting portion; and biasing means for urging said deflector against said deflector mounting surface, wherein said deflector mounting surface is smaller than a bottom surface of the non-reflecting portions of said deflector and a gap is provided between the bottom surface of non-reflecting portions of said deflector and the upper surface of said driving means.

20. A laser beam printer apparatus comprising:

laser generating means for generating a laser light;

a deflector having only two reflecting surfaces opposed to each other for deflecting the laser light, and two non-reflecting portions interposed between the reflecting surfaces;

a deflector mounting portion having a deflector mounting surface;

driving means for holding said deflector mounting portion on an upper surface of said driving means and for rotating said deflector mounting portion;

biasing means for urging said deflector against said deflector mounting surface; and a photosensitive member for receiving the laser light deflectively scanned by said deflector, wherein said deflector mounting surface is smaller than a bottom surface of the non-reflecting portions of said deflector and a gap is provided between the bottom surface of the non-reflecting portions of said deflector and the upper surface of said driving means.

* * * * *

UNITED STATES PATENT AND TRADEMARK OFFICE
CERTIFICATE OF CORRECTION

PATENT NO. : 5,363,231
DATED : November 8, 1994
INVENTOR(S) : Shin Komori

It is certified that error appears in the above-identified patent and that said Letters Patent is hereby corrected as shown below:

Column 8, line 42, change "having" to --having at least--; and     line 66, delete "having".

Signed and Sealed this

Twenty-fifth Day of April, 1995

Attest:

BRUCE LEHMAN

Attesting Officer     Commissioner of Patents and Trademarks